G. W. HATCH.
Machine for Gathering and Loading Flax, &c.
No. 60,185.
Patented Dec. 4, 1866.
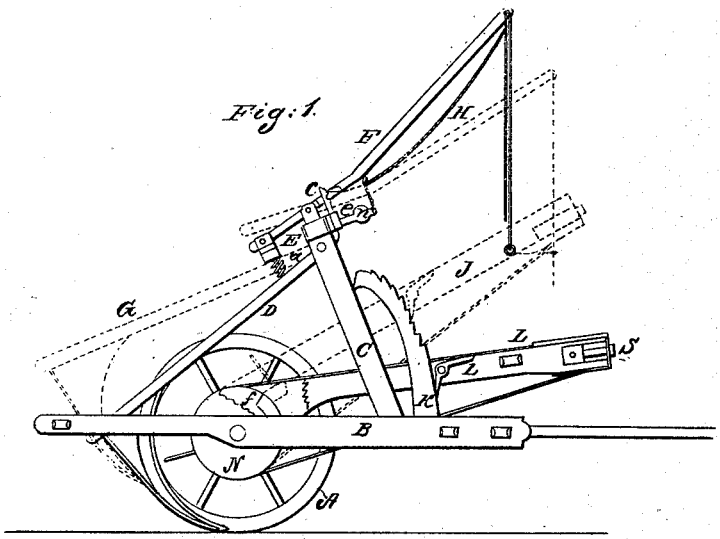
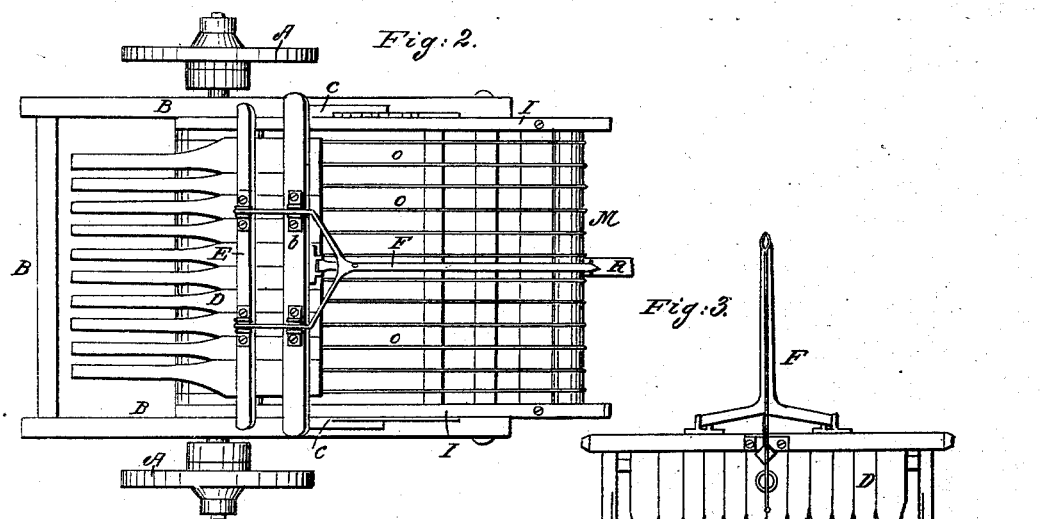
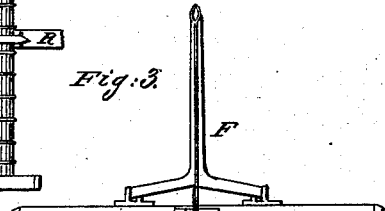
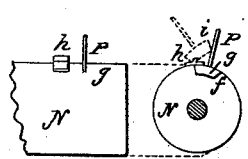
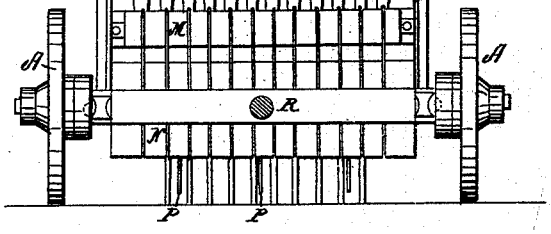
Witnesses:
W. H. Burridge
E. E. Waste
Inventor:
G W Hatch

United States Patent Office.

IMPROVEMENT IN MACHINES FOR GATHERING AND LOADING FLAX, &c.

G. W. HATCH, OF PARKMAN, OHIO.

Letters Patent No. 60,185, dated December 4, 1866.

SPECIFICATION.

TO ALL WHOM IT MAY CONCERN:

Be it known that I, G. W. HATCH, of Parkman, in the county of Geauga, and State of Ohio, have invented certain new and useful improvements in Machines for Gathering and Loading Flax, Corn, Hay, &c.; and I do hereby declare that the following is a full and clear description thereof, reference being had to the accompanying drawings, making a part of this specification, in which—

Figure 1 is a side view of the machine.
Figure 2 is a top view of the same.
Figure 3 is a front end view.
Figures 4 and 5, detached sections to be referred to.
Like letters of reference refer to like parts in the different views presented.

A, fig. 1, is a pair of wheels upon which is mounted a frame B. C, fig. 1, is a supplementary frame, to the under side of the cross-beam of which is attached the rake D; the teeth of this rake have each an independent action at the same time they are severally connected to each other by the cross-piece E, fig. 2, to which they are connected by loops surrounded by the spiral spring $a$, fig. 1. The rake can be raised bodily from the ground by means of the lever F, the two arms of which are pivoted to the top of the supplementary frame C, at the point $b$, and the extreme ends are pivoted to the cross-piece E, to which the rake is connected as above said. It will be seen by this, that by pressing down upon the straight extended arm of the lever, the rake can thereby be raised upward in the direction indicated by the dotted lines G, fig. 1, and when thus raised, it is retained in said position by the nib $c$, fig. 1, projecting from the vertical arm of the right-angled lever $e$, catching upon the point or finger $d$, which is seen to project from the angle of the lever F; H is a rope, one end of which is attached to the lever $e$, reaching thence to the extreme end of the lever F, and by which cord the lever $e$ is operated, as will be hereafter shown. I, fig. 1, is an adjustable frame or elevator, the lower end of which is attached to and supported by the axle of the wheels A, in such a manner as to permit of its outer end being raised upward in the direction indicated by the dotted lines J, more or less, as circumstances may determine. K and L are a segment ratchet and pawl, by the means of which the frame may be retained in any position desired. M is a roller. N is also a roller, around which run the endless elastic cords or bands O, to which reference will be had hereafter. On the two opposite sides of the roller N, is cut a longitudinal groove $f$, in which is fitted the lag $g$, fig. 5, and which is hinged by the side of the groove by the buts $h$, by the means of which the lag can be turned upward in the direction indicated by the dotted lines $i$, shown also in fig. 1, a section of the frame being broken away, so that it may be seen. From the lag $g$ project the arms P, the purpose of which will be hereafter shown. The roller N is fixed to the axle, whereas the wheels are loose, but which turn the roller by means of the pawl and ratchet K, fig. 4, arranged within the inner band of the hub, the pawl being forced into the ratchet by the spring $m$.

The manner of operating this machine is as follows: It is attached to the rear end of a wagon by the pole R, so that the elevator I will project over the rack. The rake is then dropped upon the ground by pulling the cord H, which, as above said, is connected to the angular lever, $e$. By pulling up the weighted arm $n$, throws the vertical one back, and thereby releases the lever F, and the rake in consequence drops upon the ground in the position shown in figs. 1 and 3. The wagon is then started, and as the rake gathers up the hay between itself and the roller N, the arms P, as they revolve with the roller, take the hay from the rake, between the teeth of which they pass, on to the elevator, and which in its turn conveys it to the upper end, over which it falls upon the wagon. As the load increases in height, the elevator can be easily raised by the person on the load, the segment ratchet and pawl above referred to holding it at any desired elevation; the endless cords or belts can at all times be readily tightened by the sliding nut and screw S, fig. 1, in which the ends of the roller are journalled. It will be seen that as the arms P revolve, the lags in which they are fixed are held securely in the grooves by the several elastic cords or bands O, until they pass forward from immediate contact with them, or rather from under them. As they are thus released, the resistance or weight of the hay on the arms causes the lag to turn upwards, thereby giving to the arms a reverse direction, so that they can be easily drawn out of the hay, thus preventing it from being drawn down between the cords, which would be the case were the arms fixed rigidly in the roller. By means of the weighted arm of the lever $e$, the vertical arm of which is at all times made to fall against the finger $d$, so that on pressing down upon the lever F, the nibs readily catch the finger, and thereby hold up the rake from the ground when not in use, or for the purpose of transporting it from place to place.

What I claim as my invention, and desire to secure by Letters Patent, is—

1. The lag $g$, hinged to the roller N, in combination with the elevator I and roller M, for the purpose and in the manner set forth.

2. The right-angled lever $e$, and cord H, in combination with the lever F, for the purpose and in the manner as substantially described.

G. W. HATCH.

Witnesses:
W. H. BURRIDGE,
E. E. WAITE.